J. A. Morrison.
Curtain Fixtures.

No. 85,751. Patented Jan. 12, 1869.

Witnesses;
G. S. Cushing
Thos. B. Kerr

Inventor;
James A. Morrison
by Bakewell & Christy
his Att'ys.

JAMES A. MORRISON, OF PITTSBURG, PENNSYLVANIA, ASSIGNOR TO JOHN H. MORRIS AND WILLIAM F. HOOD, OF SAME PLACE.

Letters Patent No. 85,751, dated January 12, 1869.

IMPROVED CURTAIN-FIXTURE.

The Schedule referred to in these Letters Patent and making part of the same.

To all whom it may concern:

Be it known that I, JAMES A. MORRISON, of the city of Pittsburg, in the county of Allegheny, and State of Pennsylvania, have invented a new and useful Improvement in Curtain and Blind-Fixture; and I do hereby declare the following to be a full, clear, and exact description thereof, reference being had to the accompanying drawing, making a part of this specification, in which—

Figures 1, 3, and 5, are side views of my improvement, in different forms of application;

Like letters of reference indicate like parts in each.

The nature of my invention consists in making the wheel, pulley, roller, or spool, on or around which a window-blind or curtain-cord is wound, with a head of other than circular shape, which head fits into a fixed socket of corresponding shape, and in so connecting the two that the head may be slipped into or out of its socket to hold the window-blind or curtain in place, or raise or lower the same, and also in combining therewith a slotted fastening-plate, for purposes of adjustment.

To enable others skilled in the art to make and use my invention, I will proceed to describe its construction and mode of operation.

$a$ is a spool, playing loosely on a spindle, $b$, the latter being rigidly attached to a plate, $d$, by which the devices are fastened to the window-jamb or casing. The spindle $b$ is a little longer than the spool $a$, so that the latter has a little longitudinal play thereon.

On the inner end of the hollow axis of the spool $a$, is a head, $c$, square, or of other than circular shape, which fits into a correspondingly-shaped socket or recess, $c'$, which is made in the plate $d$, or in a block, $d'$, attached thereto.

$f$ is a crank or handle for operating the spool $a$.

The plate $d$ is fastened to the jamb or casing of the window, and the cord from the roller of the window-blind, curtain, or shade, is attached to the spool $a$ by being knotted or otherwise secured thereto.

The spool $a$ is then slid out on its spindle $b$ till the head $c$ is clear of the socket or recess $c'$, and, by the handle $f$, the curtain or blind-cord is wound or unwound in the usual way.

Figure 1:
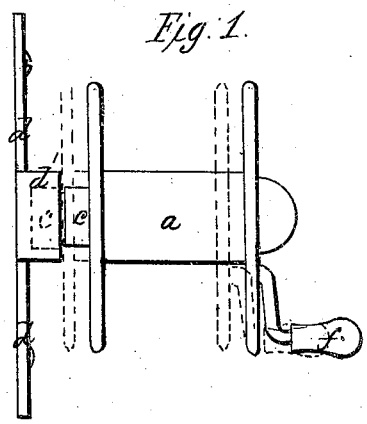

As soon as the curtain or blind is raised or lowered the desired distance, the spool $a$ is slid back on its spindle $b$, till the head $c$ enters the socket $c'$, as shown by dotted lines in fig. 1, when the curtain or blind is securely held in place.

Figure 2:
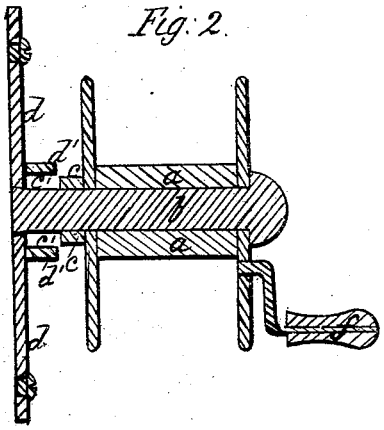
Figure 2 is a sectional view of the devices shown in fig. 1.
Figure 3:
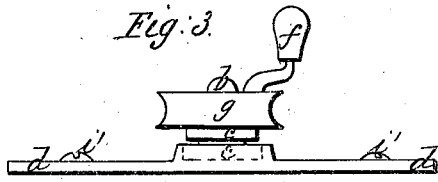

Figs. 2 and 3 show the same square head $c$, socket $c'$, spindle $b$, and handle $f$, as applied to a curtain-pulley, $g$. The operation is the same as is already described, except that the curtain-cord passes around the pulley $g$ continuously, like a belt. But with the pulley $g$ it is necessary to use some mode of adjustment, whereby the pulley $g$, being raised or lowered, the endless cord passing around it may be loosened or tightened.

Figure 4:
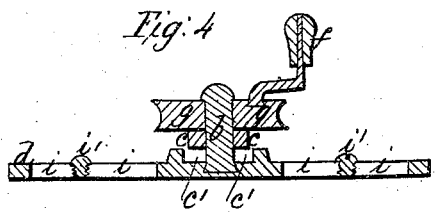
Figure 4 is a like sectional view of the devices shown in fig. 3.

For this purpose I make a slot, $i$, in the fastening-plate $d$, fig. 4, and fasten the plate $d$ to the jamb or casing by screws $i'$, having heads broader than the breadth of the slot $i$. The screw-heads will then set down on the plate $d$, and hold it at any desirable point of adjustment. A readjustment may be quickly and easily made at any time by loosening the screws $i'$, moving the plate $d$ up or down, and again tightening the screws.

Figure 5:
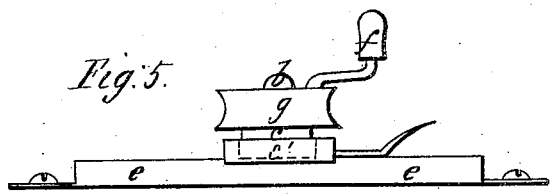

Fig. 5 shows the pulley $g$, square head $c$, socket $c'$, spindle $b$, and handle $f$, with a fastening-plate, $e$, of the usual construction.

In my invention I include the making of a head, $c$, and socket $c'$, not only of square shape, but also in any shape in cross-section other than circular, the object being, when the head $c$ is in its socket $c'$, to prevent the revolution of the spool $a$ or pulley $g$. Also, while claiming the mode of adjustment as shown in figs. 3 and 4 as my own, I also claim the use of the head $c$ and socket $c'$, in connection with fastening-plates of any known mode of adjustment, and, in addition thereto, the mode of operating the spool $a$ or pulley $g$ by a crank, $f$. Hence,

What I claim as my invention, and desire to secure by Letters Patent, is—

1. A head, $c$, of square or other than circular shape, in cross-section, attached to the wheel, pulley, roller, or spool of a curtain or blind-fixture, in combination with a recess or socket, $c'$, of corresponding shape, constructed substantially as and for the purposes hereinbefore set forth.

2. A pulley, $g$, and crank $f$, in combination with a slotted fastening-plate, $d$, constructed and used substantially as and for the purposes hereinbefore set forth.

In testimony whereof, I, the said JAMES A. MORRISON, have hereunto set my hand.

JAMES A. MORRISON.

Witnesses:
G. H. CHRISTY,
A. S. NICHOLSON.